United States Patent [19]

Ohtsuka et al.

[11] Patent Number: 4,626,096

[45] Date of Patent: Dec. 2, 1986

[54] IMAGE FORMING APPARATUS FOR FORMING A VISUAL IMAGE IN ACCORDANCE WITH IMAGE SIGNALS

[75] Inventors: Yasumasa Ohtsuka, Yokohama; Jun Asai; Yoshihiro Murasawa, both of Kawasaki; Hiroshi Sasame, Tokyo; Masaharu Ohkubo, Yokohama, all of Japan

[73] Assignee: Canon Kabushiki Kaisha, Tokyo, Japan

[21] Appl. No.: 717,952

[22] Filed: Mar. 29, 1985

[30] Foreign Application Priority Data

Apr. 2, 1984 [JP] Japan ................................ 59-63262
Nov. 28, 1984 [JP] Japan ............................... 59-251181

[51] Int. Cl.$^4$ ............................................. G03G 15/08
[52] U.S. Cl. .............................. 355/14 D; 355/3 DD; 355/14 R
[58] Field of Search ................ 355/14 R, 14 C, 14 E, 355/14 CH, 14 D, 3 DD, 3 R

[56] References Cited

U.S. PATENT DOCUMENTS

| | | | |
|---|---|---|---|
| 4,212,530 | 7/1980 | Pitts, Jr. .............................. | 355/14 R |
| 4,215,931 | 8/1980 | Tsuda et al. ......................... | 355/14 R |
| 4,345,835 | 8/1982 | Kramer et al. ...................... | 355/3 R |
| 4,378,156 | 3/1983 | Yajima et al. ................ | 355/14 E X |
| 4,452,174 | 6/1984 | Fedder ......................... | 355/3 DD X |
| 4,462,680 | 7/1984 | Ikeda ................................. | 355/14 D |
| 4,466,731 | 8/1984 | Champion et al. ............... | 355/14 D |
| 4,468,112 | 8/1984 | Suzuki et al. ..................... | 355/14 D |
| 4,506,973 | 3/1985 | Ernst ................................ | 355/3 DD |

Primary Examiner—A. C. Prescott
Attorney, Agent, or Firm—Fitzpatrick, Cella, Harper & Scinto

[57] ABSTRACT

An image forming apparatus is used in conjunction with a signal generator for producing an image signal representing an image to be recorded. The apparatus includes a device for forming a visible image with visible material on an image bearing member. The image is represented by the image signal produced by the signal generator. A time signal is also generated by a time signal generator and a measuring circuit measures the time signal so generated as a function of the production off the image signal by the image signal generator. Finally, a warning signal that indicates insufficiency of supply of the visible material for forming an image properly by the image forming device is produced on the basis of measurement of the time signal by the measuring circuit.

28 Claims, 14 Drawing Figures

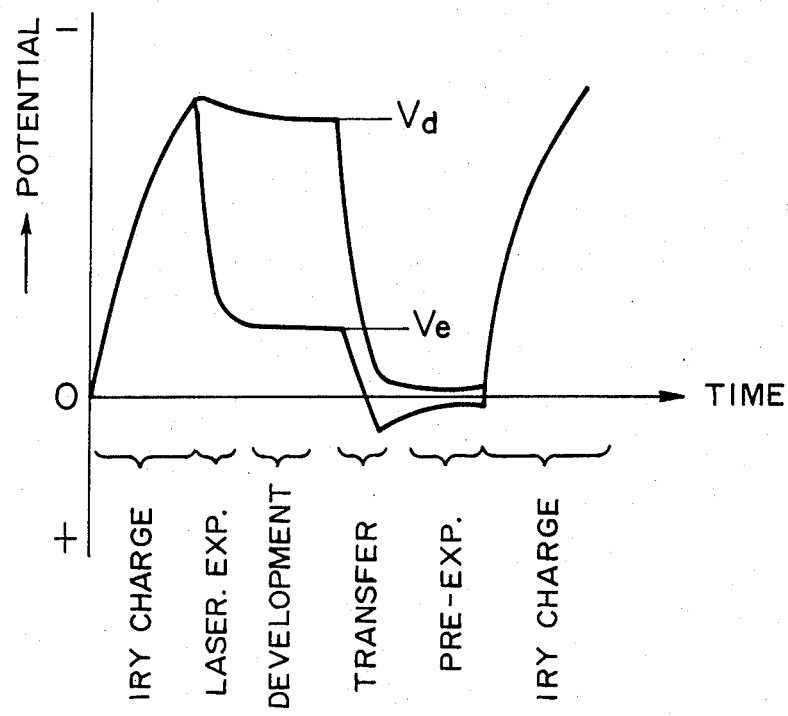
F I G. 2
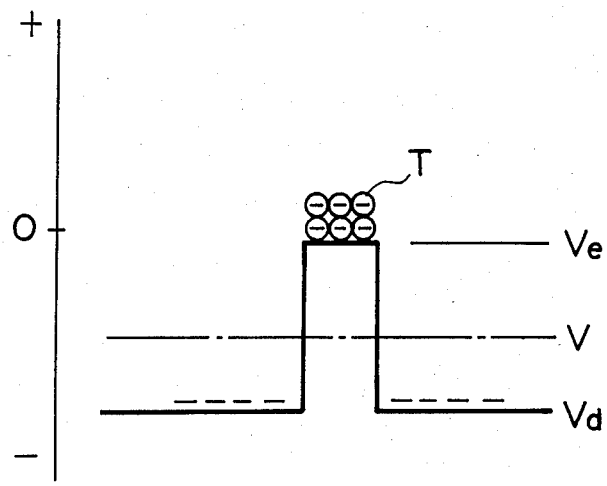
F I G. 3

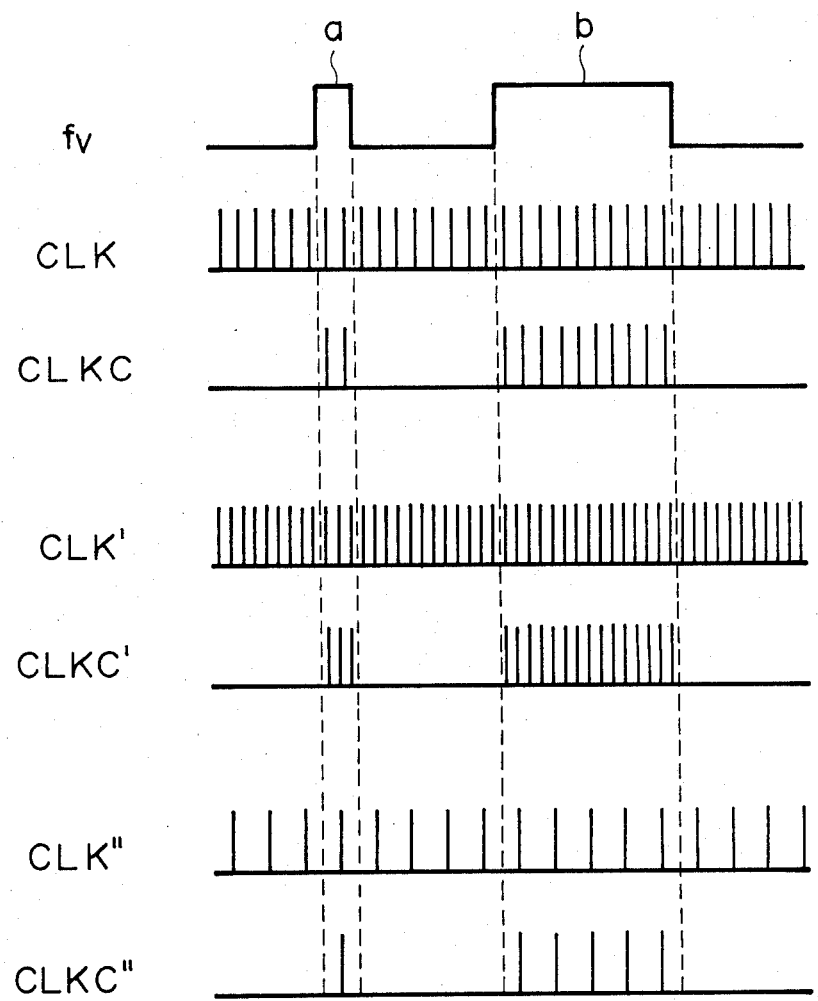
F I G. 6

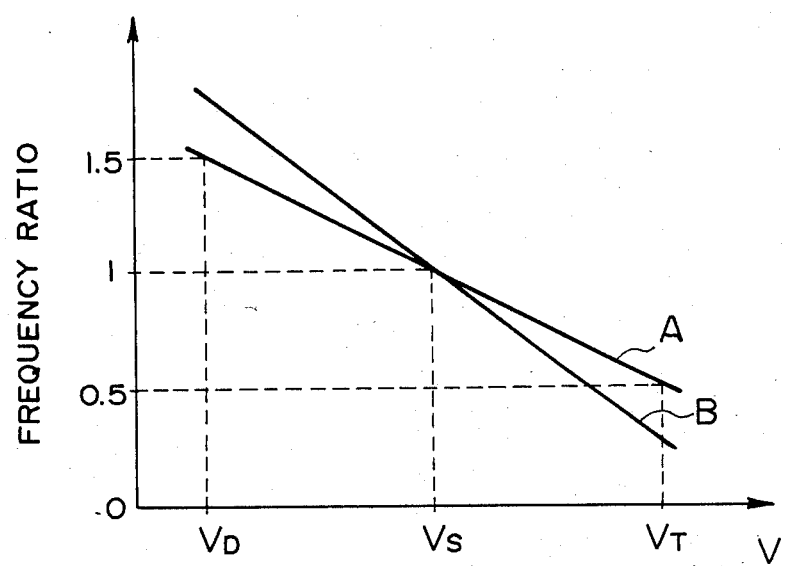
F I G. 7

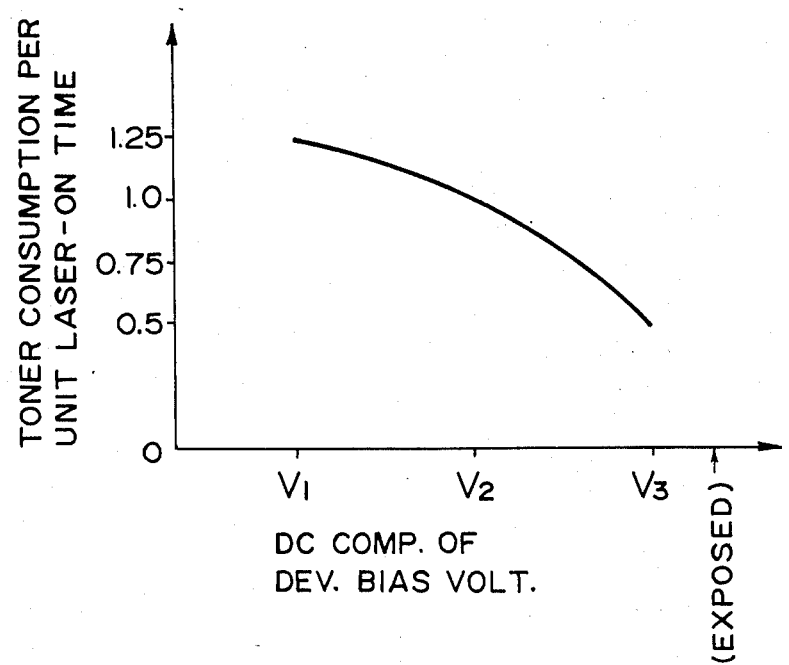
F I G. 13
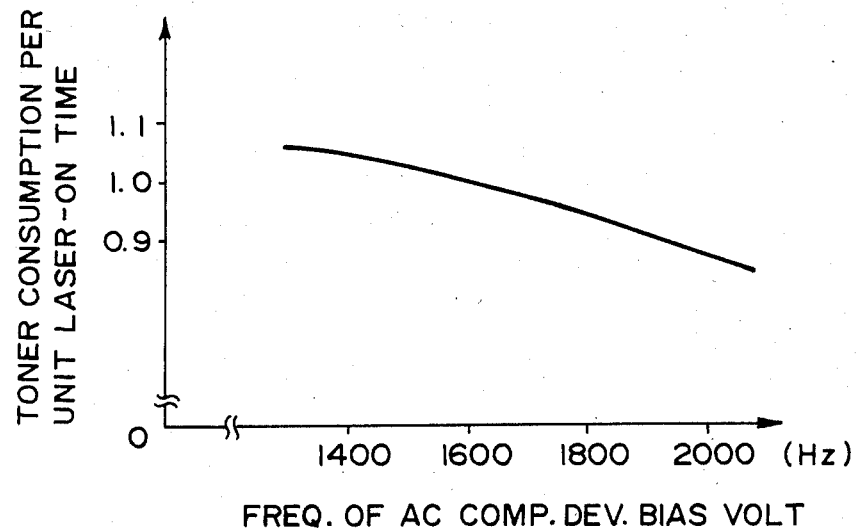
F I G. 14

IMAGE FORMING APPARATUS FOR FORMING A VISUAL IMAGE IN ACCORDANCE WITH IMAGE SIGNALS

BACKGROUND OF THE INVENTION

The present invention relates to an image forming apparatus wherein a visualized image is formed in accordance with signals representing an image to be recorded.

A laser beam printer utilizing electrophotography, is known as an example of apparatus wherein a visualized image is formed from image signals provided by a computer, a word processing system or an image sensor which reads an original and produces the image signals.

FIG. 1 illustrates an example of a laser beam printer, which comprises an image bearing member in the form of a photosensitive drum 101 including a base plate 103 and an electrophotographic photosensitive layer thereon, made of for example a phthalocyanine organic semiconductor. Around the photosensitive drum 101, there are provided a primary charger 104 and developing means 106 including a doctor blade 107, a hopper 107', a magnet roller 108 and a sleeve 109. In the hopper 107', a toner developer is contained, which is for example one component magnetic developer. Around the photosensitive drum 101, there are further provided a pre-exposure lamp 110, a guide for image transfer paper 111, a transfer charger 112 and a cleaner including a rubber blade 114 a magnet roller 115, a screw 116 and a cleaner housing 117.

The laser beam printer includes a semiconductor laser 2 which emits a laser beam 105 when it is modulated and driven by a modulator 1 in response to an image signal fv which corresponds to the image to be recorded. That is, the laser beam 105 is modulated in accordance with the image signal to be recorded. The laser beam 105 is scanningly deflected by a rotatable polygonal mirror 118 to scan the photosensitive drum which is rotating. The direction of scanning is perpendicular to the rotational movement of the photosensitive drum 101. The laser beam 105 is imaged on the photosensitive drum 101 as a spot by a lens 119.

The photosensitive drum 101 is uniformly charged by the primary charger 104 to the negative polarity, for example, and then exposed to the laser beam 105 modulated by the image signal to be recorded, whereby an electrostatic latent image is formed on the drum 101. The electrostatic latent image is visualized with the toner T by the developing means 106. The visualized image is then transferred by the transfer charger 112 onto the transfer paper introduced thereto by way of the transfer paper guide 111. The transferred toner image is fixed on the transfer paper by an unshown image fixing device, whereafter the transfer paper is discharged out of the printer.

The residual toner which has not been transferred onto the transfer paper and remains on the photosensitive drum 101, is removed from the surface of the drum 101 by the rubber blade 114, and then attracted to the magnet roller 115. The attracted toner particles are collected by a screw 116 into a toner collecting box (not shown) which is formed as a part of the cleaner housing 117. After the cleaning, the photosensitive drum 101 is electrically discharged by the lamp 110 so as to be prepared for the next step initiating with the primary charging. Thus, the photosensitive drum is repeatedly used for the image formation.

For a better understanding, FIG. 2 shows the change in the surface potential of the photosensitive drum 101 with the process of the above steps. In this Figure, the surface potential at the area not exposed to the laser beam 105 is indicated by the reference Vd, whereas the surface potential at the area exposed thereto is indicated by Ve. The difference between the potentials Vd and Ve is for example 550 V.

Generally, the laser beam printer uses a so-called image scanning type system wherein the point or part of the photosensitive drum 101 to be visualized, that is, the point or part which is to receive the toner, is exposed to the laser beam, while the part of the photosensitive drum where the toner is not substantially deposited, is not exposed to the laser beam. It is preferable in the present invention to utilize this system. This is because there is no trace of scan appearing in the background of the image and because the reproducibility of the visualized image is better, as compared with a so-called background scanning type system wherein the laser beam 105 is projected to the part of the photosensitive drum 101 which corresponds to the background of the image, while the laser beam 105 is not projected to the point or part corresponding to the point or part to be visualized. In order to deposit the toner to such a part of the photosensitive drum 101 that has been exposed to the laser beam 105, that is, the part having the surface potential Ve, the toner T is of the polarity same as the charging polarity of the primary charger 104, as shown in FIG. 3. The bias voltage to be applied to the developing means has preferably a DC component voltage V which is between the potentials Vd and Ve. However, the present invention is not limited to the image scanning type system, but is applicable to the background scanning type system, wherein the toner T is of the polarity which is the opposite to the charging polarity of the primary charger 104.

In any case, the sleeve 109 of the developing means 106 receives the toner T from the hopper 107' and carries it thereon. During the carrying, the toner T is regulated into a toner layer of a uniform thickness on the sleeve 109 by the doctor blade 107. With the rotation of the sleeve 109, the regulated toner layer is conveyed to the portion where the sleeve 109 faces the photosensitive drum 101. To the sleeve 109, the developing bias voltage is applied by a power source 122 consisting of a variable DC source 120 and a variable AC source 121. Thus, an electric field is formed between the bias potential and the potential of the electrostatic latent image potential, which electric field is effective to attract the toner from the sleeve 109 to the latent image to be developed. The toner T is triboelectrically charged by the friction among the toner particles and the friction of the toner particles with the sleeve 109, the doctor blade 107 or the like.

With continuation and integration of the printer operation, the toner T is consumed to such an extent that the amount of the toner T within the hopper 107' becomes insufficient, resulting in voids in the image. To avoid this, as shown in FIG. 4 a sensor 21 employing a piezoelectric element may be provided within the developing means 106 to detect the low level of the toner in response to the change in the sensor output. More particularly, the output voltage of the piezoelectric element changes with the weight of the toner T, and the output voltage is compared by a comparator with a predetermined reference voltage. When the comparison indicates the low level of the toner, an indication lamp 23 is lit, thus warning the operator.

However, the warning system involves a drawback since if the toner T is non-uniformly distributed to overlie the piezoelectric element 21, the lamp 23 is not turned on even if the toner level has become low, because of the still heavy weight of the toner on the piezoelectric element 21. This, of course, may result in the voids in the image. On the contrary, if the toner T is concentrated apart from the piezoelectric element 21, the weight to the piezoelectric element 21 is small despite the sufficient amount of the toner T existing in the hopper and the lamp 23 will indicate a low level of the toner T. If the toner is supplied in response to such an erroneous warning, the developing means 106 contains too much toner T, with the result that the toner T is caked therewithin, so that the image density is lowered at such a portion, or the toner fuses and sticks to the sleeve 109, whereupon a non-uniform image is formed.

Japanese Laid-Open Patent Application No. 224363/1983 proposes that the number of dots constituting the electrostatic latent image be counted, and the toner consumption is predicted on the basis of the number counted.

SUMMARY OF THE INVENTION

It has been found, however, that the time period during which a light source emits the light for one dot may vary, the light source being the laser or a light emitting diode or the like which is turned on and off in response to the image signal to be recorded. The variation may be caused for individual apparatuses due to the respective characteristics of the driving circuits. This results in that the size of the dot is different from apparatus and apparatus, so that, even if the count is the same, the toner consumption corresponding thereto may be different depending on the individual printers. In addition, it is possible to form a half tone image by changing the time period of the image signal for one dot of the image. In this case, the size of one dot is different between the half tone image and the high density image. Therefore, the toner consumption for the half tone image is different from that for the high density image, even if the count of the dots is the same. Furthermore, the toner consumption varies with the ambient conditions, such as temperature, humidity or the like within the apparatus, the surface potential of the image bearing member or the bias voltage applied to the developing means, which influence the toner image density. In brief, even if the number of dots is the same, the toner consumption may vary with the change of those factors which may result in different toner image density. No solution to this problem has been proposed.

Accordingly, it is a principal object of the present invention to provide an image forming apparatus wherein the state or amount of consumption of consumable material used in the apparatus can be more correctly detected.

It is another object of the present invention to provide an image forming apparatus wherein the consumption of image visualizing material is correctly detected even when the size of the dot constituting the image changes.

It is a further object of the present invention to provide an image forming apparatus wherein the consumption of image visualizing material is more correctly detected even when the image density changes.

These and other objects, features and advantages of the present invention will become more apparent upon a consideration of the following description of the preferred embodiments of the present invention taken in conjunction with the accompanying drawings.

BRIEF DESCRIPTION OF THE DRAWINGS

FIG. 2 is a graph illustrating the change of the surface potential of a photosensitive member.

FIG. 3 illustrates a developing action wherein the part exposed to light is visualized.

FIG. 6 illustrates the processing of signals.

FIG. 7 is a graph illustrating correction of the clock-pulse.

FIG. 13. is a graph illustrating the relationship between the toner consumption and the DC component of the developing bias voltage.

FIG. 14 is a graph illustrating the relationship between the toner consumption and the AC component of the developing bias voltage.

DESCRIPTION OF THE PREFERRED EMBODIMENTS

Figure 1:
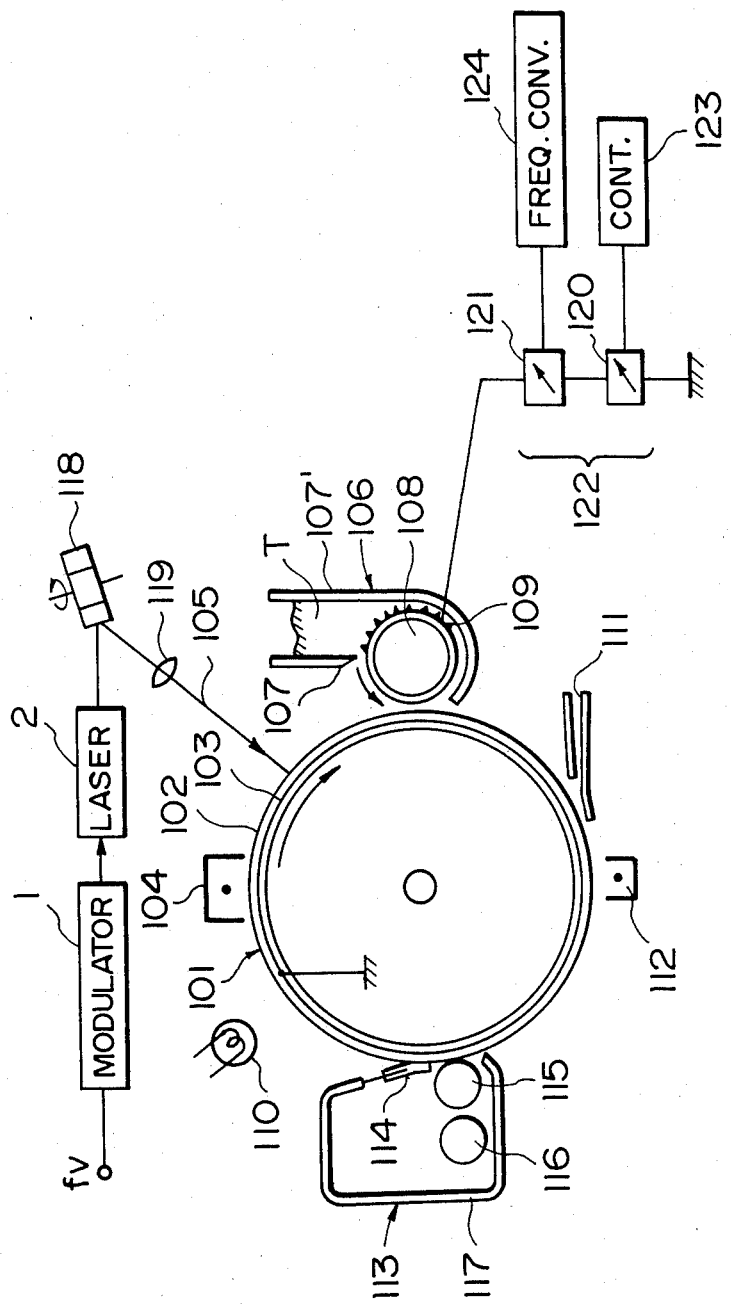
FIG. 1 is a somewhat schematical illustration of an example of a laser beam printer.
Figure 4:
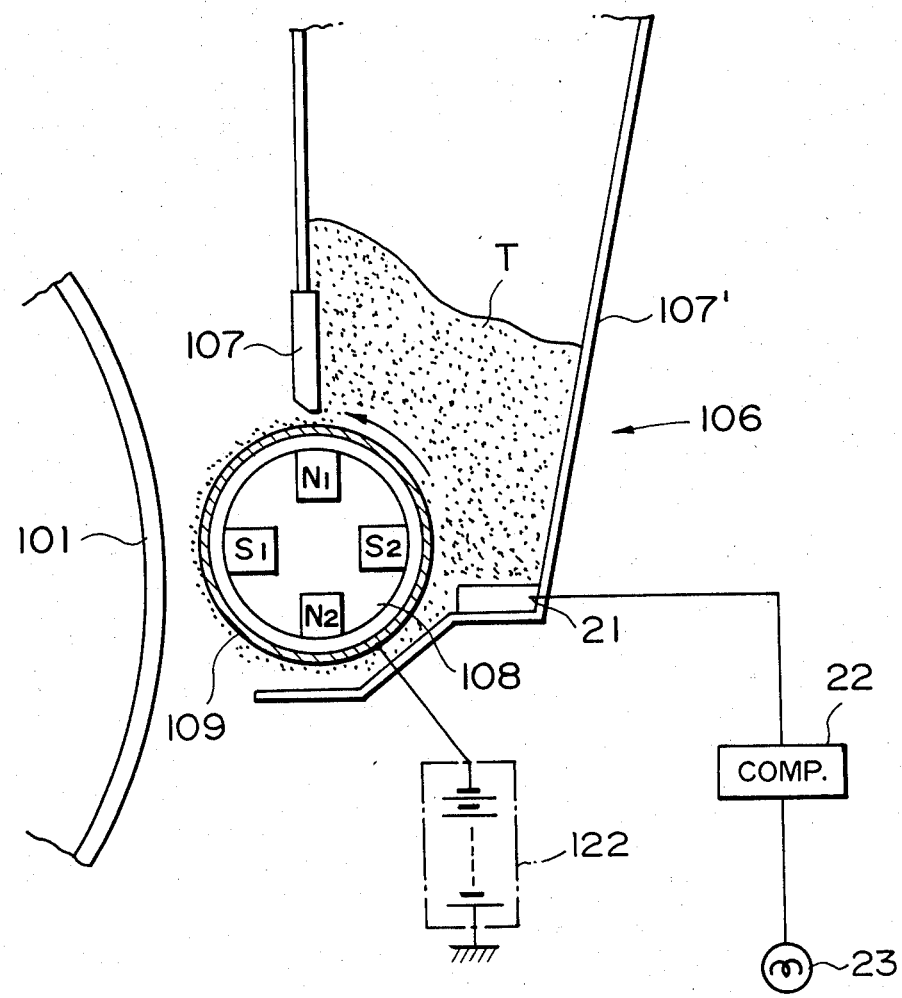
FIG. 4 is a cross-sectional view of a developing device.

In the following, the description will be omitted for means or elements having the corresponding functions as those in the apparatus shown in FIGS. 1 or 4, by assigning the same reference numerals or characters for the sake of simplicity of explanation.

Figure 5:
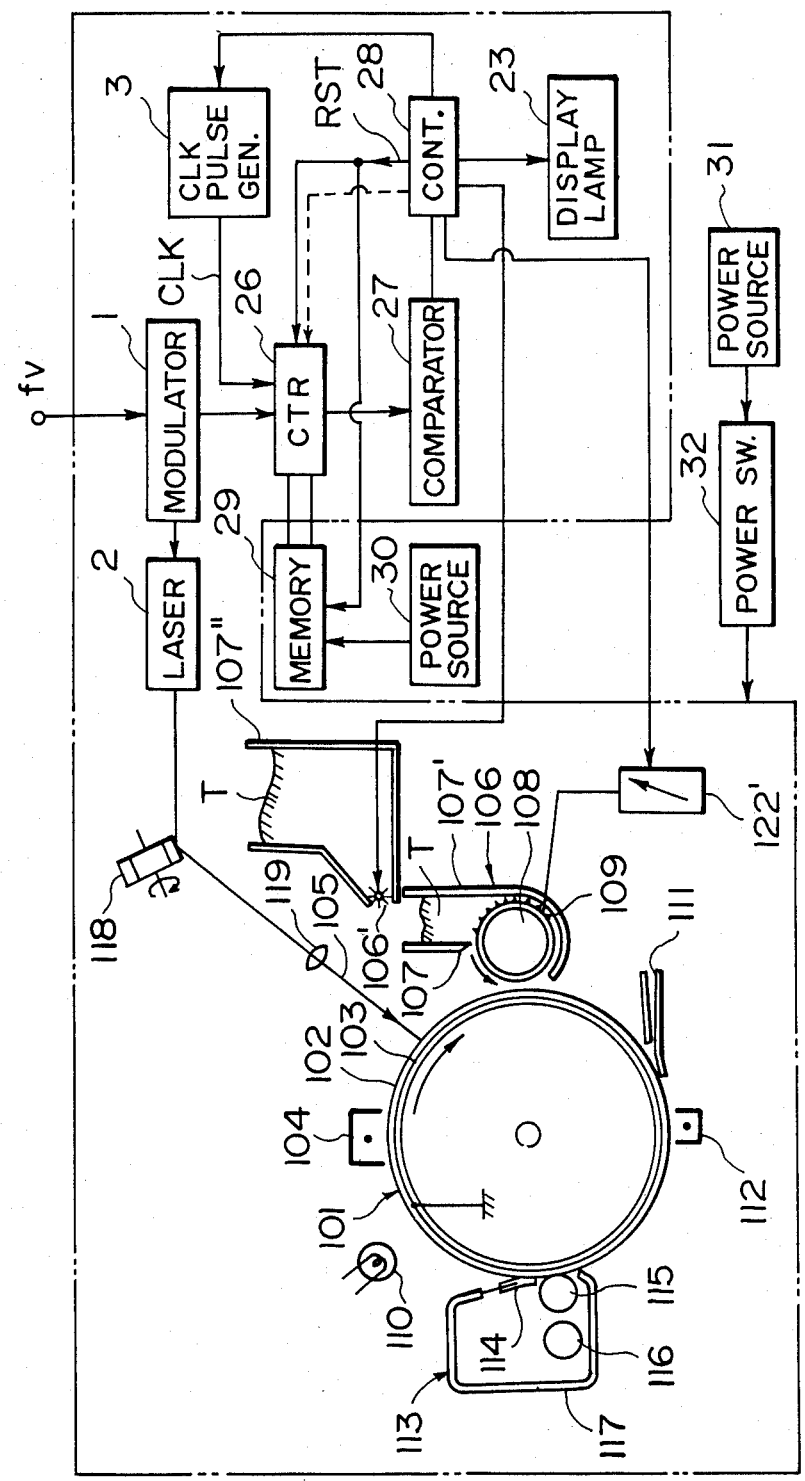
FIG. 5 illustrates an embodiment of the present invention.

Referring now to FIG. 5, there is shown a laser beam printer according to an embodiment of the present invention, wherein the image signal fv provided by an image reading device or a computer is applied to the modulator 1, which drives, that is, turns on and off the laser 2 in response to the image signal fv. In the case that the above-described image scanning type system is employed, the modulator 1 turns on the laser 2 in response to the visualizing image signal. On the contrary, if the background scanning type system is employed, the modulator 1 turns off the laser 2 in response to the visualizing signal which corresponds to the dot to be visualized. In the former case, the time period during which the laser 2 is "on" (on-period) is measured, while in the latter case, the time during which the laser 2 is "off" (off-period) is measured. In any case, the time period during which the visualizing signal is "on", is measured. For the sake of simplicity of explanation, the following description will be made for the former case, that is, the image scanning type system. It should be appreciated, however, that the present invention is applicable to the background scanning type system. Here, the visualizing signal is that part of the image signal to be recorded which corresponds to the part to be visualized as an image.

As shown in FIG. 5, the apparatus comprises a counter 26 for measuring the on-period of the laser 2, a memory 29 for storing the count of the counter 26, a comparator 27 for comparing the output of the counter 26 with a preset level, a controller 28 for controlling the entire apparatus and the indication lamp 23 for warning the operator of the short supply of the toner.

To the counter 26, both of the image signal fv and a time signal in the form of clock pulses CLK produced by a clock pulse oscillator 3. The counter 26 includes an AND gate to which the image signal fv and the clock pulses CLK are applied. The AND gate allows the clock pulses CLK to pass therethrough only during the time period of existence of the visualizing signal. The number of clock pulses CLKC (FIG. 6) passed through the AND gate is counted by the counter 26. In FIG. 6, the reference character a designates the visualizing signal for one dot of the image, and the reference character b designates the visualizing signals for 5 dots of the image.

For the portion a, two clock pulses CLKC are counted, while in the portion b, 10 clock pulses CLKC are counted.

The memory 29 sequentially stores the number of clock pulses counted by the counter 26, and the counter 26 adds the number of clock pulse CLKC to the number stored in the memory 29. The output of the counter 26, that is, the signal corresponding to the total number of the counted clock pulses CLKC, is applied to the comparator 27, which compares the total number of the clock pulses CLKC counted with a predetermined determined number. When the counted number exceeds the preset number, the comparator 27 transmits a signal to the controller 28. In response to this signal, the controller 28 turns on the indication lamp 23. The above-mentioned predetermined or preset number corresponds to the toner amount of consumption resulting in the low level of the toner in the developing means 106.

More particularly, the counter 26 counts the on-period of the laser 2 from the start, that is, 0. The counter 26 produces its output which corresponds to the total or integrated amount of the on-period of the laser 2, and the output is transmitted to the comparator 27, the total or integrated on-period corresponding to the toner consumption. The comparator 27 transmits a control signal to the controller 28 at the instant when the output of the counter 26C exceeds the reference level preset in the comparator 27. The controller 28, in response to the control signal, turns the indication lamp 23 on so as to inform the operator of the low level of the toner T. When the operator supplies a sufficient amount of the toner into the hopper 107', a resetting signal RST is transmitted from the controller 28 to the counter 26, so that the counter is reset to 0, and simultaneously, the memory 29 is cleared. The counting action restarts from 0, again. Also, simultaneously, the indication lamp 23 is turned off by the controller 28.

A toner supplying container 107" may be equipped with a supplying mechanism 106'. It is driven in response to the signal from the controller 28 to supply a predetermined amount of toner T to the hopper 107'.

A power switch 32 is effective to supply electric power to the various means enclosed by the chain line in FIG. 5, namely, the photosensitive drum 101 to be rotated, the chargers 104 and 112, the developing means 106, the scanner 118 in the form of a polygonal mirror to be rotated and the laser 2 to be driven for emitting the laser beam. When the power switch 32 is "on", the various means 101, 104, 112, 106, 118 and 2 are operated. The circuit for the power supply to the various means from the power switch 32 is omitted for the simplicity of explanation. Another power source 30 is provided for energizing the memory 29, which is effective to supply power to the memory 29 independently of the state of the power switch 32. Thus, the memory 29 is able to store the memory of the number of the counted clock pulses irrespective of "on" and "off" condition of the power switch 32. Therefore, after the power switch 32 is turned off to stop the apparatus, the time information corresponding to the toner consumption remains stored.

As described, the time signal in the form of the clock pulses CLK is counted in accordance with the signal of the image to be recorded.

When the image forming apparatus is provided with means for controlling the density of the image visualized, the toner consumption is dependent on the density of the visualized image. For this purpose, means for changing the developing bias voltage is widely used, which changes the developing bias voltage applied to the sleeve 109 of the developing means 106. In this case, the factor determining the number of clock pulses counted in the counter 26 for a given laser "on" time may be changed depending on the developing bias voltage level. More particularly, when the image density is at a high level, the factor is 1.5 in response to a unit on-period of the laser 2. For the ordinary density level, the factor is 1 in response thereto, and for a lower density level, the factor is 0.5 in response thereto. That is, the factor is changed for the same laser on-period. By changing the factor in the counter depending on the developing bias voltage level, the toner consumption is more correctly predicted, so that proper amount of toner supply is made possible.

As an example of means for changing the factor determining the number of pulses counted by the counter 26 in accordance with the developing bias voltage level, a variable clock pulse oscillator 3 may be used, by which the frequency of the pulses produced thereby is changed in accordance with the developing bias voltage level. The variable clock pulse oscillator 3 may be of the type wherein a plurality of clock pulse oscillating elements effective to produce the clock pulses of different frequencies are contained, and one of the clock pulse oscillating elements is selected in response to the bias voltage level selected, or the type wherein a single clock pulse oscillator and a frequency divider for dividing the frequency so as to produce the clock pulses having the frequency corresponding to the developing bias voltage.

In any case, when the image of the ordinary density is to be produced, the controller 28 selects a ordinary image density voltage Vs as the output of the developing bias source 122' which is, for example, a variable DC source, and causes the clock pulse oscillator 3 to produce the clock pulses CLK shown in FIG. 6. When a high density image is to be formed, the controller 28 selects a high image density voltage Vd for the source 122' and causes the clock pulse oscillator 3 to produce the clock pulses CLK' having a frequency which is 1.5 times the frequency of the clock pulses CLK. When a low density image is to be formed, the controller 28 selects a low density image voltage Vt and causes the clock pulse oscillator 3 to produce the clock pulses CLK″ having the frequency which is 0.5 times the frequency of the clock pulses CLK, as shown in FIG. 6. In FIG. 6, the clock pulses CLKC′ are those pulses of the clock pulses CLK′ which have been passed through the AND gate. The pulses CLKC″ are those pulses of the clock pulses CLK″ which have been passed through the AND gate. Thus, when the high density image is produced, the clock pulses CLKC′ are counted. When, on the other hand, the low density image is to be formed, the clock pulse CLKC″ is counted by the counter 26.

FIG. 7 shows the relation between the developing bias level and the frequency factor of the clock pulses in the counter (clock pulse frequency ratio). The above-described embodiment is expressed by the line A.

Depending on the individual apparatuses and the kinds of toner, the inclination of the line in the graph of FIG. 7 may be changed as shown by the line B. Additionally, the line is not necessarily linear, but may be a curve depending on characteristics of developing action.

The foregoing embodiment and the modification thereof are such that the frequency of the clock pulses produced by the clock pulse oscillator 3 is changed in accordance with the developing bias voltage level. This is not limiting, but the same frequency of the clock pulses CLK may be used for any of the image density. In this case, the counter 26 produces the output which corresponds to the number of the clock pulses CLKC multiplied by a constant which is determined in accordance with the selected image density. For this purpose, the counter 26 is provided with a calculating function. The controller 28 selects the constant corresponding to the image density for the sake of counter 26. For example, if the line A of FIG. 7 is employed, the counter 26 produces a signal of 1.5 ($=1.5 \times 1$) in response to one clock pulse CLKC, when a high density image is to be formed. A signal of 1 ($=1.0 \times 1$) is produced when the ordinary density image is to be produced. And, the signal of 0.5 ($=0.5 \times 1$) is produced when the low density image is to be formed.

In any case, when the count of the clock pulses corrected in accordance with the image density reaches a predetermined level, the comparator 27 produces a signal to a controller 28, which turns the indication lamp 23 on and/or drives the supplying mechanism 106′.

In order to change the density of the visualized image, the output of the charger 104 may be changed, or the intensity of light produced by the laser 2 may be changed. In any of those cases, it is preferable that the frequency of the clock pulses produced by the clock pulse oscillator 3 is changed, or the operation of the counter 26 is changed, as described above.

As the factors influencing to the image density, description has been made as to the developing bias voltage, the intensity of the laser output and the output of the charger 104. However, there are additional factors.

Figure 8:
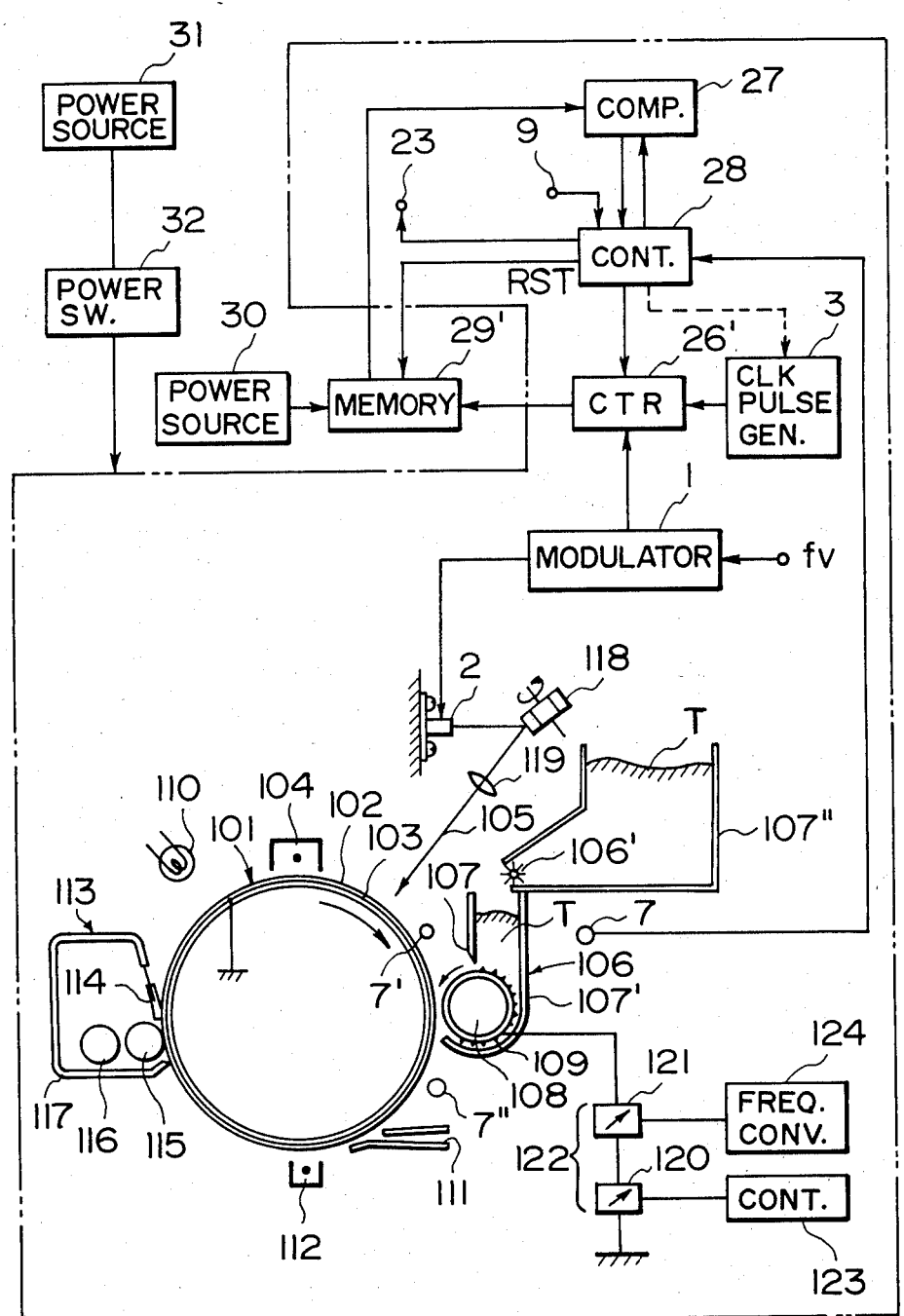
FIG. 8 illustrates another embodiment of the present invention.

FIG. 8 illustrates another embodiment of the present invention, wherein the clock pulse oscillator 3 produces the clock pulses CLK as shown in FIG. 6 with respect to any image forming conditions. The counter 26′ is provided with the above-described multiplying function so as to count the clock pulses CLKC depending on factors influencing to the image density. More particularly, the counter 26′ produces an output corresponding to the number ($c \times N$) which is the number obtained by multiplying the number N of the clock pulses CLKC by a constant c which is determined corresponding to a factor influencing to the image density. The memory 29′ receives the output of the counter 26′ and memorizes the sum. Therefore, the numerical information provided from the counter 26′ and to be memorized by the memory 29′, is corrected by the change of the factor, the numerical information corresponds to a unit on-period of the laser 2, that is, a unit on-period of the visualizing signal. When the numerical information stored in the memory 29′, that is, the numerical information corresponding to the integrated time period which corresponds to the formation of the visualized portion and which has been corrected in response to the change of the factor, reaches a predetermined level, the comparator 27 produces a signal to the controller 28, which actuates the indication means 23 which may be in the form of a lamp or a voice generator and/or drives the supplying mechanism 106′, in the manner similar to the foregoing embodiment. Upon the supply of a predetermined amount of toner into the hopper 107′ by the supplying mechanism 106′ from the toner supplying container 107″ or by the operator and actuation of the reset switch 9, the controller 28 clears the memory 29′.

The constant c is selected by the controller 28 in resonse to the factors and is set to the counter 26′. The controller 28 detects the change in the factor on the basis of outputs of sensors.

Designated by the reference numeral 7 is a humidity sensor preferably disposed adjacent to the developing means 106. The output of the humidity sensor 7 is representative of the humidity (amount of water vapor) and is transmitted to the controller 28, which, in response to the humidity information, selects the constant c to be set in the counter 26′.

Figure 9:
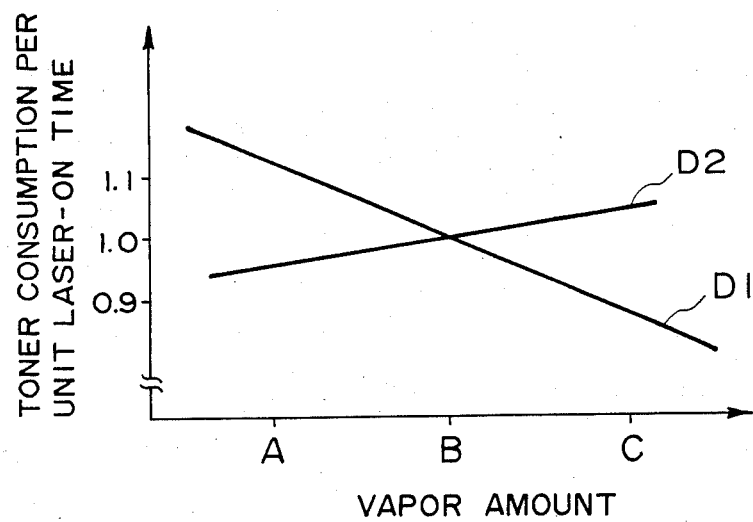
FIG. 9 is a graph illustrating the relation between the toner consumption and the amount of water vapor.

The change in the humidity influences to the toner consumption, which will be described. With the change of the humidity, the amount of triboelectric charge to the toner particles changes, also the electric resistance of the toner changes, or the flowability of the toner particles changes. Because of those and other reasons, the toner consumption for a unit on-period of the laser 2 changes with the change of the humidity. For example, as shown in FIG. 9, when developing means exhibiting the property of line D1 in FIG. 9 in the relation between the toner consumption and the vapor amount, the controller 28 adds 1.13 to the memory 29′ for a unit on-period of the laser 2 under a low humidity condition A, whereas the factor is 1 for unit on-time of the laser 2 from the counter 26′ to the memory 29′ under the ordinary humidity condition B. On the contrary, under a high humidity condition C, the amount of 0.87 is added to the memory 29′ per unit on-period. Such corrections are made by multiplying correction factor c to the output of the counter 26′. Depending on the kinds of toner or developing devices, the toner consumption changes along the line D2 which is opposite in inclination to the line D1. The constant c is similarly corrected to provide proper correspondence between the exposure period and the toner consumption. It is possible that the relation is not expressed by a rectilinear line but by a curved line. In that case, the correction factor corresponding to the vapor amount is predetermined on the basis of the relation between the toner consumption and the amount of the water vapor with the particular toner and the particular apparatus, as shown in FIG. 9, and the operation of the counter 26′ is controlled by the controller 28 on the basis of the correction factor thus predetermined.

Figure 10:
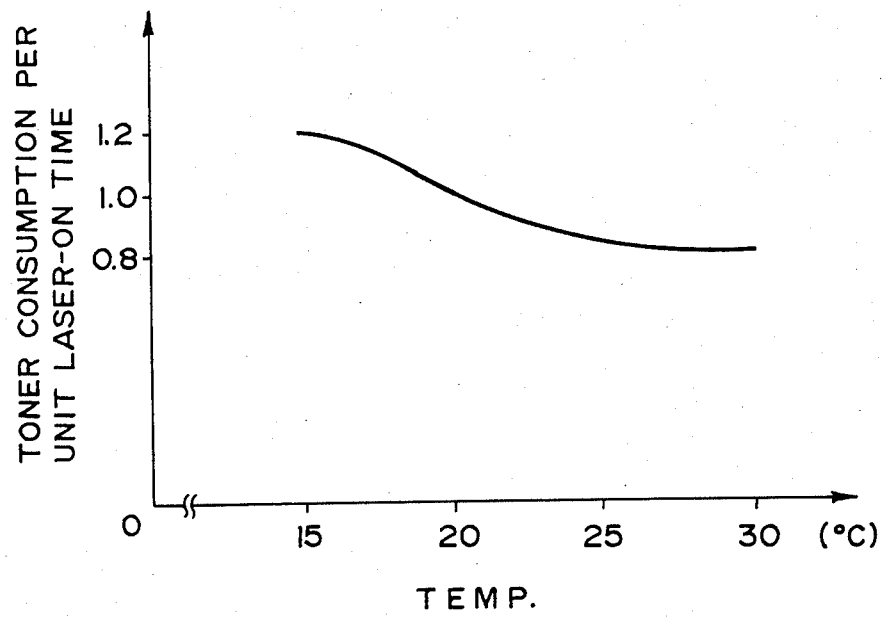
FIG. 10 is a graph illustrating the relationship between the toner consumption and the temperature.

Also, the temperature change influences the toner consumption, because it may result in the change in the property of the toner and the sensitivity of the photosensitive member. Therefore, it is preferable to effect correction of the factor c in response to the temperature change. In this case, a temperature sensor is used as the sensor 7. When the relation between the toner consumption and the temperature is as shown in FIG. 10, for example, the factor of the numerical information from the counter 26' to the memory 29' is 1 at the temperature of 20° C. per unit laser on-period; is 0.8 at 30° C.; and is 1.2 at 15° C. The operation of the counter 26' may be controlled in response to both of the temperature and humidity changes.

Figure 11:
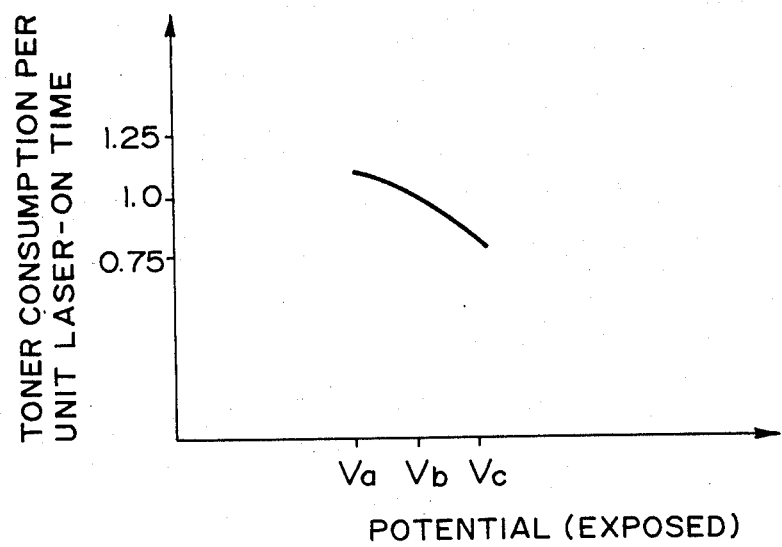
FIG. 11 is a graph illustrating the relationship between the toner consumption and the surface potential of the photosensitive member at the exposed area.

The surface potential of the photosensitive member changes correspondingly to the property change of the photosensitive member. The toner consumption varies with the change in the surface potential of the photosensitive member. In this example, the developing means is employed which is of the reversal development type wherein the toner is deposited on such a portion that is exposed to the laser beam. In this type, the potential of the photosensitive member at the exposed portion changes the toner consumption. Therefore, it is preferable to control the constant c in response to the surface potential of the photosensitive member. When the exposed portion potential and the toner consumption is so related as shown in FIG. 11, for example, the factor of numerical information from the counter 26' to the memory 29' per unit on-period of the laser is corrected to be 1.05, 1 and 0.825, correspondingly to the surface potential of Va, Vb and Vc, respectively. The surface potential of the photosensitive member is detected by a potential sensor 7' disposed between the beam exposure station and the developing station as shown in FIG. 8. The output of the sensor 7' is applied to the controller 28.

Figure 12:
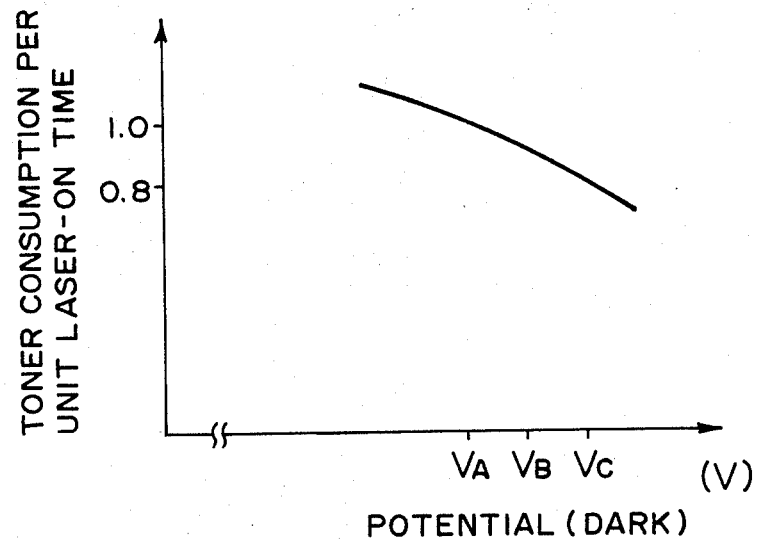
FIG. 12 is a graph illustrating the relationship between the toner consumption and the surface potential of the photosensitive member at the non-exposed area.

Also, the so-called dark potential which is the potential of the background portion where no toner is deposited influences to the toner consumption because it can apply Coulomb force to the toner. When the relationship between the dark potential and the toner consumption is as shown in FIG. 12, for example, the factor of the numerical data from the counter 26' to the memory 29' per unit laser on-period is 1 when the dark potential is $V_A$; and it is 0.92 and 0.81 when the potential is $V_B$ and $V_C$, respectively. This operation is effective to meet the deterioration of the drum sensitivity and the variation in the receiving potential. The operation of the counter 26' may be controlled on the basis of the exposed portion potential and the dark potential by sensing both of them by the potential sensor 7' and transmitting the outputs to the controller 28.

In the embodiment of FIG. 8, the bias voltage applied to the sleeve 109 of the developing means 106 is a superposition of the DC voltage to the AC voltage. That is, the bias voltage source 122 comprises both of a DC source 120 and an AC source 121. The output of the DC source 120 is controlled by controlling means 123 in the form of a variable resistor, for example, to change the DC component of the developing bias voltage. The toner consumption changes with this change. Therefore, the amount of addition from the counter 26' to the memory 29' may be preferably controlled in response to the change in the DC voltage component of the developing bias voltage. To accomplish this, the signal for controlling the DC voltage source controlling means 123 is also applied to the controller 28, and the constant c is controlled in response to this signal. When there is a relationship between the toner consumption and the DC voltage component, as shown in FIG. 13, for example, the factor of the numerical data from the counter 26' to the memory 29' per unit laser on-period is 1 when the bias DC voltage component is standard, that is, $V_2$; it is 1.25 when the DC component is $V_1$; and it is 0.5 when it is $V_3$. By doing so, the toner consumption is correctly predicted on the basis of the laser on-period in the apparatus wherein the operator controls the image density or the background fog by changing the DC component of the developing bias voltage.

Additionally, the AC component of the developing bias voltage also influences the toner consumption because the tone of the image changes with the change of the frequency and the amplitude of the AC component. Therefore, it is also preferable that the constant c is corrected to correct the numerical data added from the counter 26' to the memory 29' in response to the change in the AC voltage component. When the relationship between the frequency of the AC voltage and the toner consumption per unit laser on-period is as shown in FIG. 14, the signal for controlling the frequency converter 124 is also applied to the controller 28. When the frequency is 1600 Hz, the amount of 1 is added from the counter 26' to the memory 29' per unit laser on-period; when it is 1400 Hz, 1.04 is added; and when 2000 Hz, 0.87 is added. Here, the description has been made with respect to the frequency. However, an amplitude converter is used to change the amplitude of the output of the AC source 121, the constant c is corrected in response to the amplitude of the AC component of the developing bias voltage selected. And, the corrections may be effected in response both to the frequency and amplitude.

Because of this, the toner consumption is correctly predicted in the type of apparatus wherein the AC component of the developing device is changed to change the tone reproducibility. However, the present invention is applicable when only one of the DC voltage and the AC voltage is employed as a variable developing bias.

It is preferable that plural signal generating means are provided corresponding to the factors influencing to the toner consumption, to correct the amount of addition of the numerical data from the counter 26' to the memory 29' per unit laser on-period by the controller 28 responsive to the plural factors.

In the foregoing examples, the density of the visualized image is indirectly predicted. However, it is possible that a densitiy sensor 7" shown in FIG. 8 and comprising a light emitter and a light receptor may be used to directly sense the reflection density of the visualized image formed on the photosensitive drum 101. The output of the sensor 7', that is, the density information signal as to the visualized image, is applied to the controller 28, which is effective to correct the constant c in response to the detected density of the visualized image. More particularly, with the increase of the density of the visualized image, the constant c is increased so as to provide a better correspondence between the toner consumption per unit laser on-period and the numerical information added to the memory 29'.

In the foregoing embodiments, the operation of the counter 26' is corrected. However, that type of the clock pulse oscillator 3 which has been described in conjunction with FIG. 5 may be used, that is, the clock pulse oscillator 3 which produces the clock pulses having different frequencies, such as shown by CLK, CLK' and CLK" shown in FIG. 6. In this case, the counter 26' may be replaced simply by an AND gate which receives both of the image signal to be recorded and the output of the clock pulse oscillator 3 and which allows the clock pulses to pass therethrough only during the existence of the visualizing signal, as shown in FIG. 6 by the clock pulses CLKC, CLKC' and CLKC" to be received by the memory 29'. The memory 29' adds and stores the number of clock pulses passed through the AND gate. The controller 28 changes the frequency of the clock pulses produced by the clock pulse oscillator 3, in response to at least one of the changes in the signals from the sensors 7, 7' and 7" and the signals for controlling the controlling means 123 and 124. More particularly, under the image forming conditions resulting in higher density of the visualized image, the oscillator 3 produces the clock pulses CLK' at a higher frequency, while under the image forming conditions resulting in lower density of the visualized image, the oscillator 3 produces the clock pulses CLK" at a lower frequency. Under the image forming conditions leading to the standard density of the visualized image, the oscillator 3 produces the clock pulses CLK. Thus, the memory 29' adds and stores the time period required for the formation of the visualized portion, which period has been corrected in response to the density of the formed image, that is, the corrected toner consumption.

In any case, the time information memorized in memory 29' reaches with use of the apparatus a predetermined level, and at that time, the comparator 27 produces a signal, in response to which the controller 28 effects the above-described control.

When the sensor 7' and/or 7" is utilized, a test signal is applied to the modulator 1 before or after the application of the image signal fv to be recorded. In response to the test signal, a test latent image is formed on the photosensitive member 101, and the potential of the test latent image is detected by the sensor 7', and/or, the test latent image is developed by the developer 106, the density of which developed image is detected by the sensor 7". The information of the test image potential and/or the density of the test developed image is applied to the controller 28. The controller 28, in response to the potential and or the density, controls the operation of the counter 26' or the output of the clock pulse oscillator 3, in the manner described above. Of course, the above control may be effected on the basis of the image potential and/or the image density corresponding to the image signal fv to be recorded.

In the FIG. 8 embodiment, an electric memory is driven by a power source 30 which is exclusively for the electric memory, that is, the memory 29', which power source is kept "on" independently of "on" and "off" of the power switch 32. However, in place thereof, a mechanical memory may be used which comprises a gear driven by a motor in response to the output of the counter 26' by the amount responsive to the output of the counter 26' so that the rotational or angular position of the gear corresponds to the intgrated amount of the counter output. In this case, the mechanical memory 29' can keep the memory independently of the actuation or the deactuation of the power switch 32, without the necessity of using the exclusive power source for the memory 29'.

The present invention is applicable to an image forming apparatus employing multi-modulating system. In such a system, the image signal fv to be recorded contains a high density image signal and a half tone image signal, both of which are visualizing signal. The half tone imaging signal has a shorter period of time for one dot of the image than the time period of the high density imaging signal for one dot of the image. This system is also called a pulse modulation system.

The present invention is also applicable to an apparatus wherein an optical fiber tube is used as the light source for the image light projecting onto the photosensitive member. Additionally, the present invention is applicable to an apparatus utilizing as the light source for the information light a so-called LED array that is, a number of fine light emitting diodes arranged in a line transverse to the direction of photosensitive member movement. In this case, the individual fine light emitting diodes are driven in response to the imaging signals to be recorded. The present invention is also applicable to an apparatus utilizing as the light source for the information light a device comprising a back light source, a number of fine liquid crystal shutters arranged in a line transverse to the direction of the photosensitive member movement and disposed between the back light source and the photosensitive member, that is, a so-called LCS array. In this case, individual fine liquid crystal shutters are driven in response to the image signals to be recorded. In any case, the photosensitive member is not limited to the drum or cylinder type, but a belt-like photosensitive member is usable. As the photoconductive layer of the photosensitive member, Se, CdS, ZnO, amorphous silicon or the like are usable. Furthermore, the present invention is not limited to the image forming apparatus of an electrophotography type. Rather, it is applicable to an apparatus utilizing as the image bearing member an electrically insulating material, and employing as an electrostatic latent image forming means ion generating means, such as pin electrodes, wherein a number of fine ion generating portions are arranged in a line extending transverse to the image bearing member movement as an array. In this case, the individual ion generating portions are driven in response to the image signals to be recorded, and the ions generated at the individual ion generating portions are applied to the insulating member so that an electrostatic latent image is formed.

In the above-described examples, particularly with an LED array, LCS array and ion generating means, even if the visualized dot image is substantially continuous in the directon parallel to the longitudinal direction of the array, a dot signal is applied to each of the LED elements, LCS elements or the ion generating portions as the image signal to be recorded. In other words, an LED element and the adjacent LED element, for example, are driven by the dot signals which are independent from each other. In this case, to the counter 26' of FIG. 8, the image signal to be recorded consisting of dot signal array, not the clock pulses, may be applied. In this case, the counter 26' produces an output corresponding to the number of dot signals and a factor or information corresponding to the density of the visualized image.

Furthermore, the present invention is applicable not only to the toner but also to the other consumable materials, parts or particles.

Additionally, the present invention is applicable to an image forming apparatus of a so-called ink jet printing system. In that case, the consumption of the ink and or the degree of consumption of the ink jet generating portion may be discriminated.

While the invention has been described with reference to the structures disclosed herein, it is not confined to the details set forth and this application is intended to cover such modifications or changes as may come within the purposes of the improvements or the scope of the following claims.

What is claimed is:

1. An image forming apparatus used in conjunction with means for producing an image signal representing an image to be recorded, said apparatus comprising:
   means for forming a visivble image, as represented by the image signal, with visible material on an image bearing member;
   means for generating a time signal;
   means for measuring the time signal generated by said time signal generating means as a function of the production of the image signal by said producing means; and
   means for generating a signal, indicating insufficiency of supply of the visible material for said forming means to properly form a visible image on the basis of measurement of the time signal by said measuring means.

2. An apparatus according to claim 1, further comprising means for modifying operation of said measuring means on the basis of change in a factor influential to the density of visible material forming the visible image.

3. An apparatus according to claim 1, further comprising means for modifying the time signal on the basis of change in a factor influential to the density of visible material forming the visible image.

4. An apparatus according to any one of claims 1-3, further comprising power switch means for supplying electric power to said forming means, wherein said measuring means includes memory means for storing data relating to the measurement thereby, and said memory means stores the date independently of actuation and deactuation of said power switch means.

5. An apparatus according to claim 4, further comprising display means responsive to the signal produced by said signal generating means so that an operator may be apprised of said insufficiency.

6. An image forming apparatus used in conjunction with means for producing an image signal representing an image to be recorded, said apparatus comprising:
   means for forming a visible image, as represented by the image signal, on an image bearing member;
   means for measuring the image signal;
   means for modifying operation of said measuring means on the basis of change in a factor influential to the density of visible material forming the visible image by said forming means; and
   means for generating a signal, indicating insufficiency of supply of the visible material for said forming means to properly form a visible image, on the basis of measurement by said measuring means.

7. An apparatus according to claim 6, further comprising power switch means for supplying electric power to said forming means, wherein said measuring means includes memory means for storing data relating to the measurement thereby, and said memory means stores the data independently of actuation and deactuation of said power switch means.

8. An apparatus according to claim 7, further comprising display means responsive to the signal produced by said signal generating means so that an operator may be apprised of said insufficiency.

9. An image forming apparatus used in conjunction with means for producing an image signal representing an image to be recorded, said apparatus comprising:
   means for forming an electrostatic latent image, as represented by the image signal, on an image bearing member;
   means for developing with developer the electrostatic latent image formed by said electrostatic latent image forming means;
   means for generating clock pulses;
   power switch means for supplying electric power to said electrostatic latent image forming means, developing means and clock pulse generating means;
   means for measuring the clock pulses generated by said clock pulse generating means, as a function of production of the image signal by said producing means, wherein said measuring means includes memory means for storing measurement thereby, and said memory means stores the measurement independently of actuation and deactuation of said power switch means; and
   means for generating a signal, indicating insufficiency of supply of developer for said developing means to properly develop the electrostatic latent image, when the measurement by said measuring means reaches a predetermined level.

10. An apparatus according to claim 9, wherein said measuring means measures the clock pulses when a portion of the image signal representing the visible image exists.

11. An apparatus according to claim 10, further comprising means for modifying operation of said measuring means on the basis of change in density of the developed image provided by said developing means.

12. An apparatus according to claim 10, further comprising means for modifying a frequency of the clock pulses to be measured by said measuring means, on the basis of a change in a density of the developed image provided by said developing means.

13. An apparatus according to claim 11 or 12, wherein said modifying means includes means for detecting a surface potential of said image bearing member, and effects modifying operation thereof on the basis of detection by said detecting means.

14. An apparatus according to claim 11 or 12, wherein said modifying means includes means for detecting a reflection density of the developed image provided by said developing means, and effects modifying operation therof on the basis of detection by said detecting means.

15. An apparatus according to claim 11 or 12, wherein said modifying means includes means for detecting temperature in said apparatus, and effects modifying operation thereof on the basis of detection by said detecting means.

16. An apparatus according to claim 11 or 12, wherein said modifying means includes means for detecting humidity in said apparatus, and effects modifying operation thereof on the basis of detection by said detecting means.

17. An apparatus according to claim 11 or 12, wherein said developing means includes means for carrying developer thereon to apply the developer to said image bearing member, means for applying bias voltage to said developer carrying means and controlling means for changing a bias voltage applied thereto, wherein said modifying means effects modifying operation thereof on the basis of change in the bias voltage.

18. An apparatus according to any one of claim 9-12, further comprising display means responsive to the signal generated by said signal generating means so that an operator may be apprised of said insufficiency.

19. An apparatus according to any one of claims 9-12, wherein said developing means includes means for supplying developer in response to the signal generated by said signal generating means.

20. An image forming apparatus used in conjuction with means for producing an image signal representing an image to be recorded, said apparatus comprising:
   means for forming an electrostatic latent image, represented by the image signal, on an image bearing member;
   means for developing with developer the electrostatic latent image provided by said electrostatic latent image forming means;
   power switch means for supplying electric power to said electrostatic latent image forming means and said developing means;
   means for measuring the portion of the image signal representing visible portions of the image represented thereby, said measuring means including memory means for storing measurement thereby, said memory means storing the measurement independently of actuation and deactuation of said power switch means;
   correcting means for controlling operation of said measuring means in accordance with a density of the developed image provided by said developing means; and
   means for generating a signal, indicating insufficiency of supply of developer for said developing for said developing means to properly develop the electrostatic latent image, when the measurement stored in said memory means reaches a predetermined level.

21. An apparatus according to claim 20, wherein said correcting means includes means for detecting a surface potential of said image bearing member, and controls operation of said measuring means on the basis of detection by said detecting means.

22. An apparatus according to claim 20, wherein said correcting means includes means for detecting a reflection density of the developed image provided by said developing means, and controls operation of said measuring means on the basis of detection by said detecting means.

23. An apparatus according to claim 20, wherein said correcting means includes means for detecting temperature in said apparatus, and controls operation of said measuring means on the basis of detection by said detecting means.

24. An apparatus according to claim 20, wherein said correcting means includes means for detecting humidity in said apparatus, and controls operation of said measuring means on the basis of detection by said detecting means.

25. An apparatus according to claim 20, wherein said developing means includes means for carrying developer thereon to apply the developer to said image bearing member, means for applying bias voltage to said developer carrying means and controlling means for changing a bias voltage applied thereto, wherein said correcting means controls operation of said measuring means on the basis of a change in the bias voltage.

26. An apparatus according to claim 20, further comprising display means responsive to the signal generated by said signal generating means so that an operator may be apprised of said insufficiency.

27. An apparatus according to claim 20, wherein said developing means includes means for supplying developer in response to the signal generated by said signal generating means.

28. An apparatus according to claim 9, 10, 11, 12 or 20, wherein said image bearing member is an electrophotograpic photosensitive member, and said electrostatic latent image forming means includes means for producing light to which said electrophotographic photosensitive member is exposed and which is modulated in accordance with the image signal to be recorded.

* * * * *